United States Patent
Li

(10) Patent No.: US 7,626,512 B2
(45) Date of Patent: Dec. 1, 2009

(54) POWER WIRE CARRIER WAVE AUTOMOBILE ANTI-COLLISION RADAR

(75) Inventor: Yaotao Li, Zhongshan (CN)

(73) Assignee: Steelmate Co, Ltd, Zhongshan, Gu ( * ) Notice: Subject to any disclaimer, the term of this patent is extended or adjusted under 35 U.S.C. 154(b) by 255 days.

(21) Appl. No.: 11/814,079

(22) PCT Filed: Aug. 11, 2005

(86) PCT No.: PCT/CN2005/001244

§ 371 (c)(1),
(2), (4) Date: Jul. 17, 2007

(87) PCT Pub. No.: WO2006/076839

PCT Pub. Date: Jul. 27, 2006

(65) Prior Publication Data

US 2008/0048849 A1 Feb. 28, 2008

(30) Foreign Application Priority Data

Jan. 18, 2005 (CN) .................. 2005 2 0053675 U

(51) Int. Cl.
*G08G 1/16* (2006.01)

(52) U.S. Cl. .............. 340/903; 340/435; 340/436

(58) Field of Classification Search ............. 340/431, 340/435, 436, 903, 904, 937; 701/1, 49, 701/301; 359/362, 400
See application file for complete search history.

(56) References Cited

U.S. PATENT DOCUMENTS

| 5,619,370 | A  | * | 4/1997 | Guinosso | 359/362 |
| 6,542,085 | B1 | * | 4/2003 | Yang | 340/903 |
| 7,341,264 | B2 | * | 3/2008 | Swannie | 280/164.1 |

FOREIGN PATENT DOCUMENTS

| CN | 2322197 | | 2/1996 |
| CN | 2257926 | | 7/1997 |
| CN | 2276433 | | 3/1998 |
| CN | 2396402 | | 9/2000 |
| CN | 2518734 | | 10/2002 |
| CN | 2670179 | | 1/2005 |
| CN | 1600601 | A * | 3/2005 |
| DE | 3924171 | A1 | 1/1991 |
| EP | 0419399 | A1 | 3/1991 |

* cited by examiner

Primary Examiner—Van T. Trieu
(74) Attorney, Agent, or Firm—Molins & Co

(57) ABSTRACT

A power wire carrier wave automobile anti-collision radar, is composed of ultrasonic wave transmitting and receiving sensors (2), a host machine (3) and a digital display (4), and is characterized in that the hose machine (3) is mounted inside the trunk of the automobile, and its power wire is connected to the reversing light wire at the rear of the automobile; the digital display (4) is laid on the instrument panel of the automobile, and its power wire is connected to the reversing gear light wire in the instrument panel of the automobile, wherein the electric wire connection is not needed between the host machine and the digital display, and the disassembling of the automobile body in large area and the wiring are not needed when mounting.

3 Claims, 6 Drawing Sheets

_US 7,626,512 B2_

POWER WIRE CARRIER WAVE AUTOMOBILE ANTI-COLLISION RADAR

TECHNICAL FIELD OF THE INVENTION

The invention is a power wire carrier wave automobile anti-collision radar, which is in the technical field of automobile anti-collision.

PRIOR ART

With the increasing well-developed highway system today, automobiles have become one of primary means of transportation, and thus automobile safety has also aroused general concern, an automobile anti-collision radar arises at the historic moment. Current automobile anti-collision radar is mainly composed of ultrasonic wave transmitting and receiving sensors, a host machine, the digital display. Ultrasonic wave transmitting and receiving sensors are mounted at the rear of the automobile, which are used to detect barriers behind the automobile, The digital display is laid in front of a driver and is connected to the host machine via cables, this cable connected the digital display and host machine pass through the inside of automobile body, therefore disassembling of automobile body in large area is needed, which result in difficult assembly and time consumption.

THE OBJECT OF THE INVENTION

It is the object of the present invention to provide a power wire carrier wave automobile anti-collision radar to solve the problem of the difficulties in assembling an automobile anti-collision radar. The power wire of the digital display of said automobile anti-collision radar is connected to the reverse gear light wire in the instrument panel, The power wire of the host machine is connected to the reversing light wire at the rear of the automobile, and the host machine could be set in a certain right place, there is no any wire connection between the host machine and the digital display, so the disassembling of the automobile body in large area and the wiring are not needed when mounting. It is characterized by its time-saving mount and its easy assembly.

EMBODIMENTS OF THE INVENTION

The invention is implemented that a power wire carrier wave automobile anti-collision radar is composed of ultrasonic wave transmitting and receiving sensors, a host machine, the digital display;

The host machine comprise ultrasonic wave transmitting and receiving amplifying circuit, band-pass amplifying circuit, double voltage shaping circuit, electronic switch, micro-processor and power circuit, and is mounted inside the trunk of the automobile; The digital display is composed of micro-processor, sound amplifying circuit, horn, display drive circuit, LED and power circuit, and is laid on the instrument panel of the automobile;

The positive pole of the power wire of said host machine is connected to the positive pole of the reversing light wire at the rear of the automobile, and its negative pole is earthed;

There is a carrier wave transmitting circuit in said host machine, the signal output of the micro-processor in said host machine is connected to the signal input of said transmitting circuit, the signal output of said transmitting circuit is connected to one end of the power wire of said host machine.

The positive pole of the power wire of said digital display is connected to the positive pole of the reversing gear light wire in the instrument panel of the automobile, its negative pole is earthed;

A power wire carrier wave automobile anti-collision radar characterized in that there is a carrier wave receiving circuit in said digital display, The signal input of said receiving circuit is connected to one end of the power wire of said digital display, the signal output of said receiving circuit is connected to the signal input of the -2- micro-processor in said digital display.

The present invention has some strong points that there is no any wire connection needed between the host machine and the digital display, so the disassembling of the automobile body in large area and the wiring are not needed when mounting. It is characterized by its time-saving mount and its easy assembly.

ABSTRACT OF THE DRAWINGS

1 is the automobile.
2 is the ultrasonic wave transmitting and receiving sensors of the present invention.
3 is the host machine of the present invention.
4 is the digital display of the present invention.
5 is the ultrasonic wave transmitting and receiving amplifying circuit of the host machine.
6 is the electronic switch of the host machine.
7 is the micro-processor of the host machine.
8 is the band-pass amplifying circuit of the host machine.
9 is the double voltage shaping circuit of the host machine.
10 is the power circuit of the host machine.
11 is the carrier wave transmitting circuit of the host machine.
12 is the carrier wave receiving circuit of the digital display.
13 is the micro-processor of the digital display.
14 is the sound amplifying circuit of the digital display.
15 is the display drive circuit of the digital display.
16 is the power circuit of the digital display.
17 is the LED of the digital display.
18 is the horn of the digital display.

The following is a further description of the embodiments of the present invention:

DETAILED DESCRIPTION OF THE INVENTION

Figure 2:
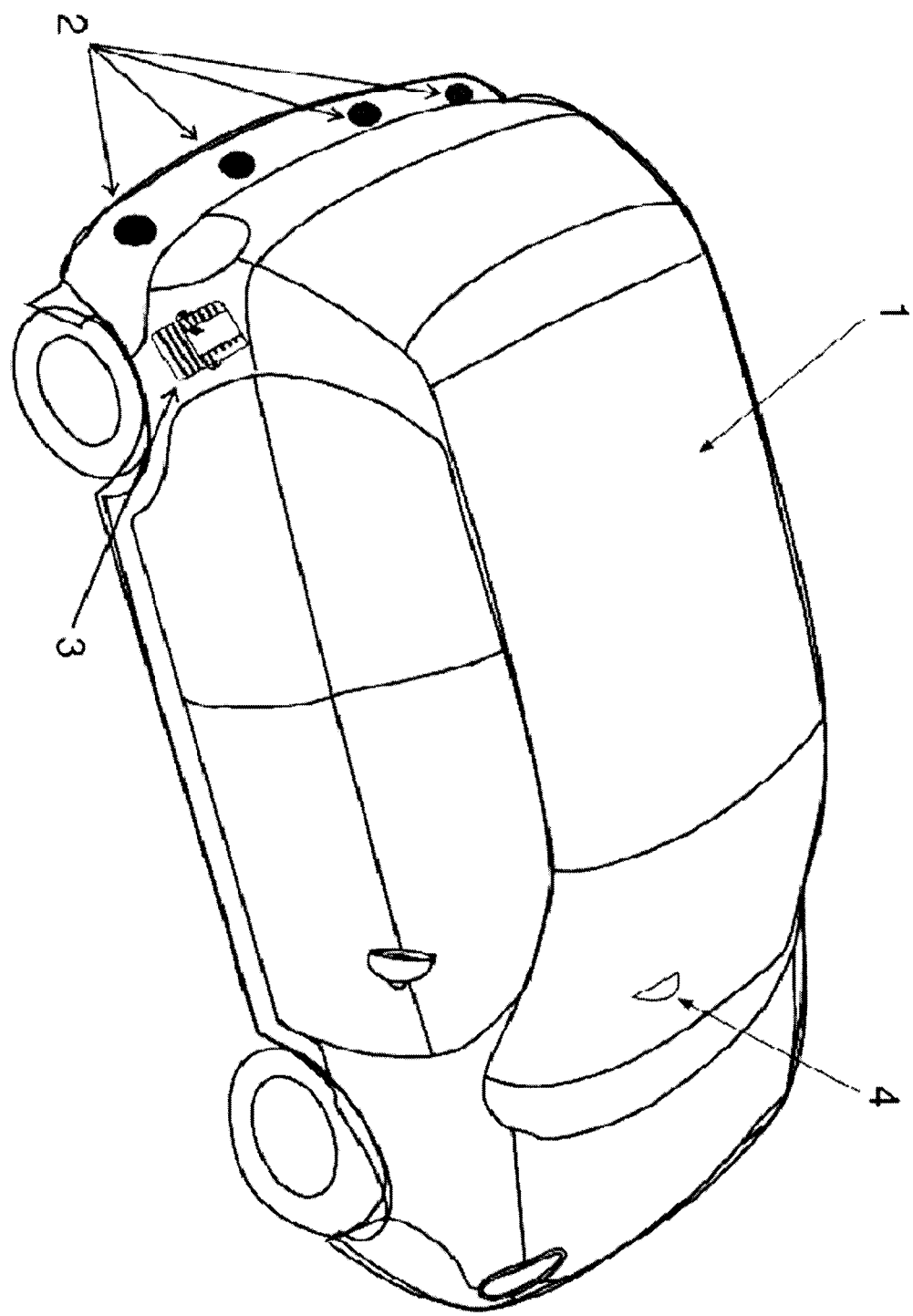
FIG. 2 is the schematic diagram for installation of the present invention.

FIG. 2 is a schematic diagram for installing a power wire carrier wave automobile anti-collision radar. an automobile anti-collision radar is installed In the automobile 1, which comprise the ultrasonic wave transmitting and receiving sensors 2, a host machine 3 and a digital display 4, The ultrasonic wave transmitting and receiving sensors 2 are mounted at the rear of the automobile, the host machine 3 is mounted inside the trunk of the automobile, and the digital display 4 is laid on the instrument panel of the automobile.

Figure 1:
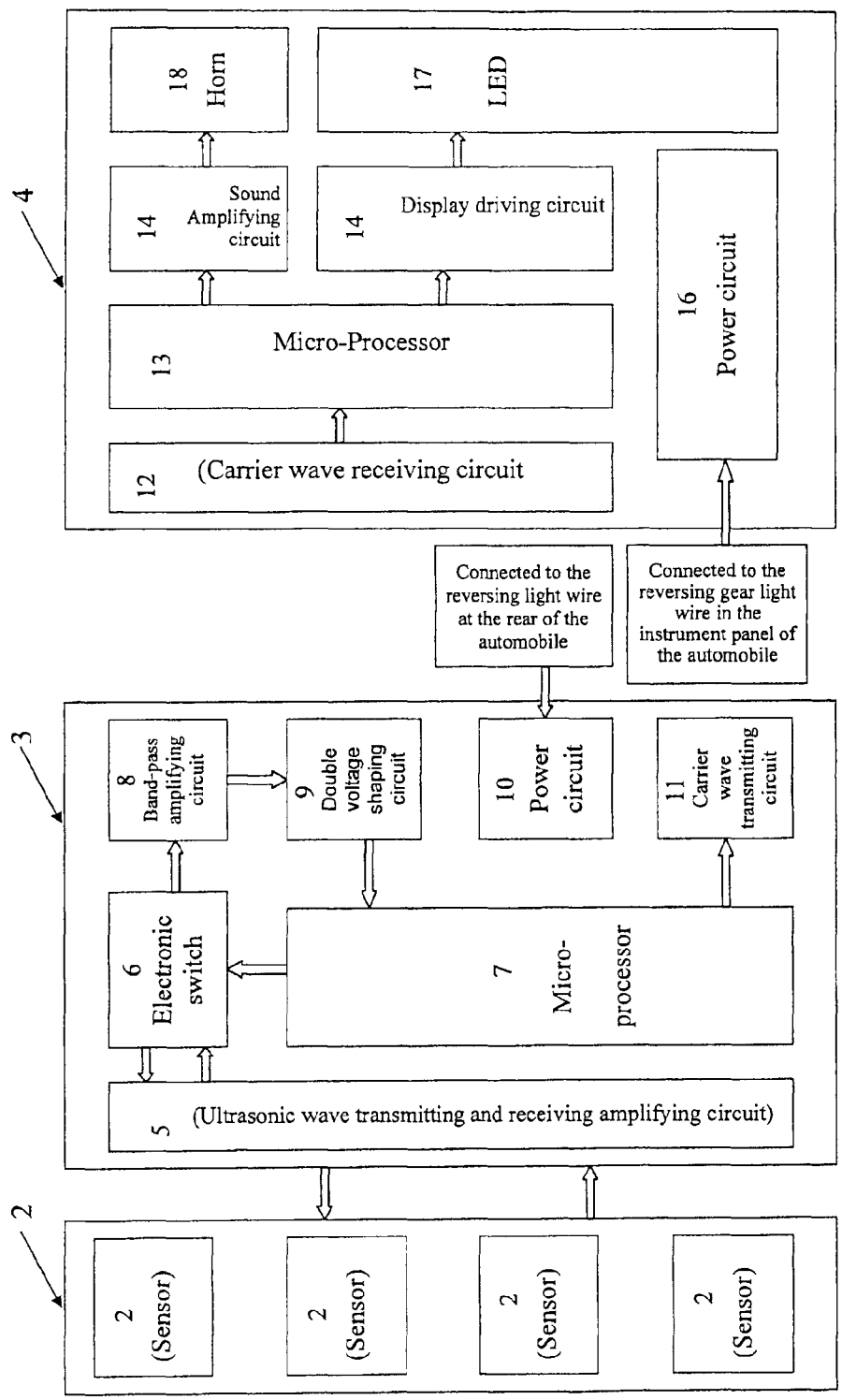
FIG. 1 is the schematic diagram of the present invention.

As the FIG. 1 shown, the circuit of the host machine 3 comprises ultrasonic wave transmitting and receiving amplifying circuit 5, band-pass amplifying circuit 8, double voltage shaping circuit 9, electronic switch 6, micro-processor 7, carrier wave transmitting circuit 11 and power circuit 10.

The circuit of the digital display 4 is composed of carrier wave receiving circuit 12, micro-processor 13, sound amplifying circuit 14, horn 18, display drive circuit 15, LED 17 and power circuit 16.

The working procedure of the present invention is that the micro-processor 7 of the host machine outputs ultrasonic wave signals to each of 4-way corresponding -4-ultrasonic wave transmitting amplifying circuits 5 in sequence by the electronic switch 6 controlled by the micro-processor 7, The signals are then sent out through ultrasonic wave transmitting and receiving sensors 2, and reflected upon them when encountering barriers, After said sensor 2 received the reflecting signals, these signals are amplified by each of 4-way corresponding ultrasonic wave receiving amplifying circuits 5, and switched to band-pass amplifying circuit 8 respectively in sequence by the electronic switch 6 for amplifying again, Then, the double voltage shaping circuit 9 converts these signals into board impulse wave, the display signals are output via the micro-processor 7 and are modulated by the carrier wave module 11, these signals will be carried to the power wire via the carrier wave module 11, and are transmitted to the digital display 4 through the power wire, Then, the carrier wave receiving module in the digital display amplifies said carrier wave signals, and modulates these display signal, these display signals pass to the micro-processor 13 of the digital display 4 for processing, and then input to the display drive circuit 15, the LED 17 will indicate the distance between the automobile and the barriers, at the same time, the micro-processor 13 will output audio signals to sound amplifying circuit 14, warning sound will be made by the horn 18.

Figure 3:
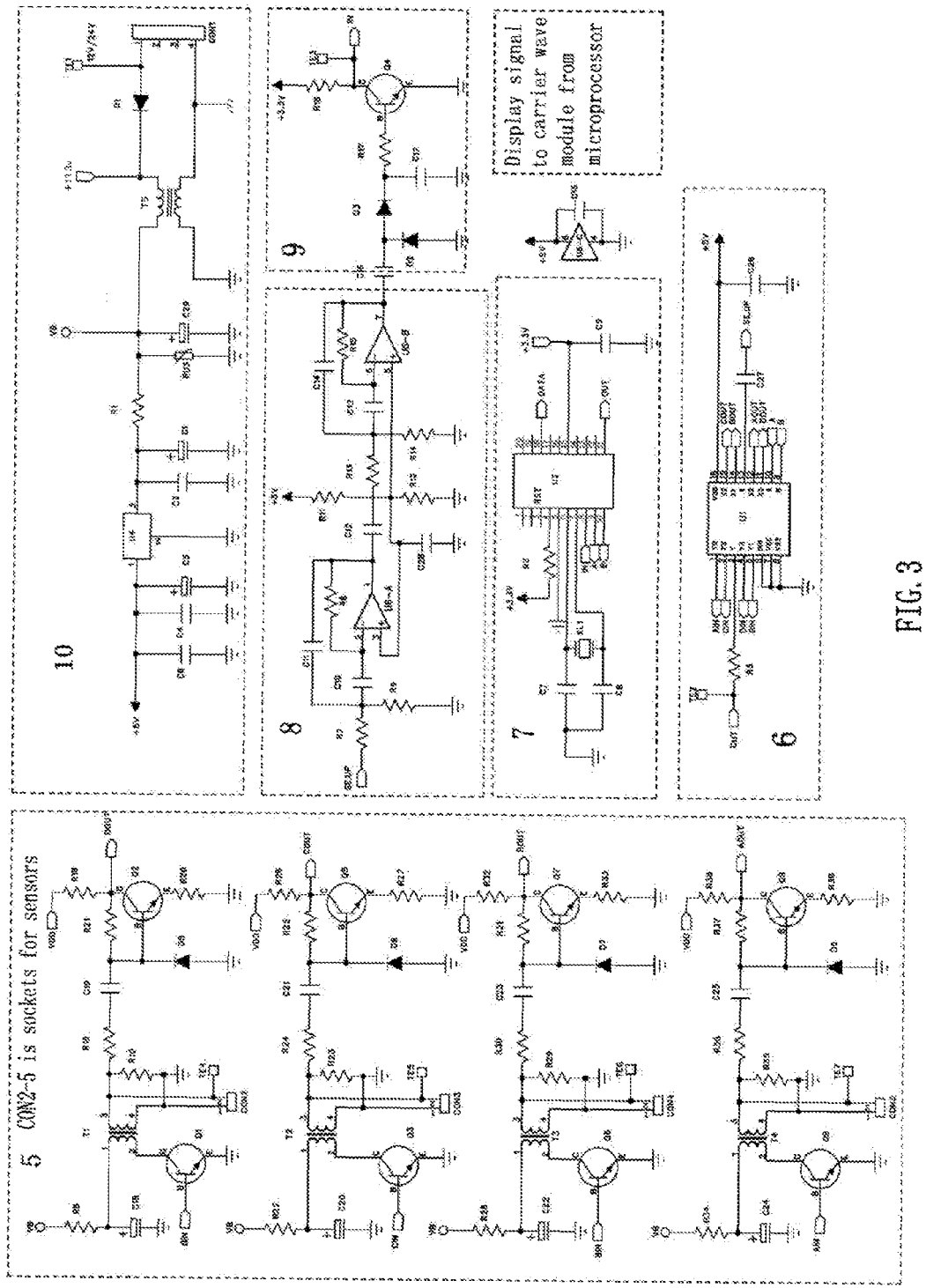
FIG. 3 is the circuit schematic diagram of the host machine of the present invention.

The following is a further description of the working principle according the detailed circuits:

As the FIG. 3 shown, U2 11th pin output the ultrasonic wave signals, which are then coupled with the electronic switch U1 3rd pin by R5, these signals are respectively transmitted to the corresponding transmitting circuit formed by Q1, Q3, Q6, Q8 and peripheries Via the 1st pin, 2nd pin, 4th pin and 5th pin of U1, and then, it couple with socket CON2, CON3, CON4 and CON5 via T1, T2, T3 and T4, finally these signals are transmitted to the ultrasonic transmitting and receiving sensors. After that, the ultrasonic transmitting and receiving sensors will receive the ultrasonic signals reflected from the barriers, The ultrasonic signals are then amplified by the four groups of amplifying circuit formed by Q2, Q5, Q7, Q9 and peripheries, and output to -5- 11th pin, 12th pin, 14th pin and 15th pin of U1, next, U1 switches these signals to 13th pin in sequence, these signals are amplified by the band-pass amplifier formed by U6 and its peripheries amplifies, and are then converted to board impulse wave via Q4's shaping and amplifying after the double voltage detector formed by D2 and D3, and output to U2 8th pin, these display signals are output from U2 18th pin after internal processing of the micro-processor, and output to J2 in FIG. 4 by J3. CON1 is the power socket of the reversing light wire at the rear the automobile. D1, T5, C1, C4, C5, C6, C29 and U4 form a power circuit, which supply electricity to all circuits of the host machine respectively.

Figure 4:
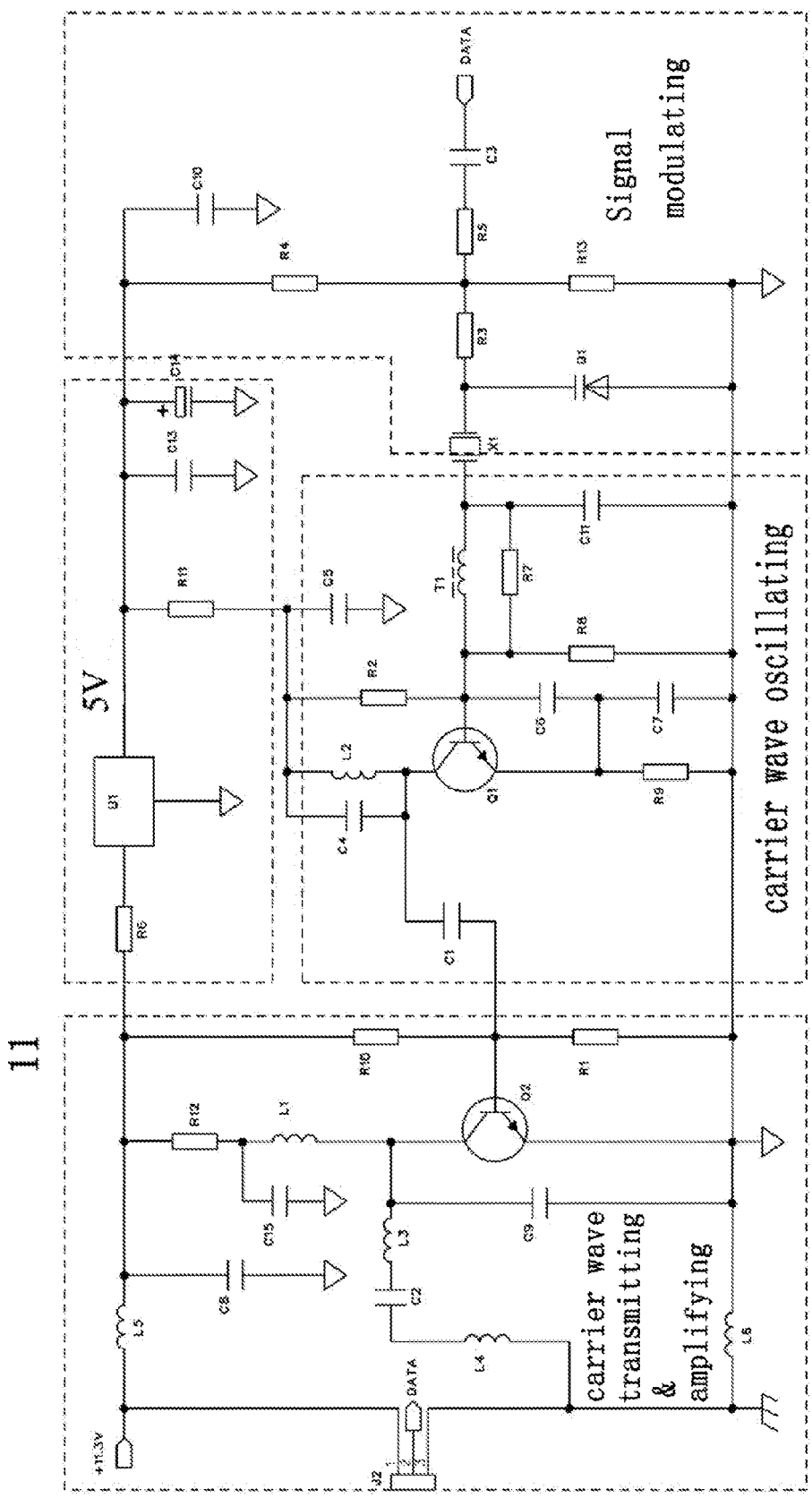
FIG. 4 is the circuit schematic diagram of the carrier wave transmitting module of the present invention.

As FIG. 4 shown, J2 is connected to J3 which is the outlet for display signals in FIG. 3, the display signals is output to a modulating circuit composed by D1, R3, R4 and R13 , via C3 and R5, and is modulated in FM mode by the carrier wave oscillating circuit composed by Q1, T1, X1, C11, R7, R8, R2, R9, C6, C7 and D1, and then is amplified by a carrier wave amplifying circuit composed Q2, R10, L1, C9, C15 and R12, and transmitted to J2 via L3, C2 and L4, J2 is connected to J3 in FIG. 3, and then to CON1 in FIG. 3, Thus, the carrier wave signals are sent to the digital display via the power wire. The 5V voltage stabilizing circuit composed R6, U1, C13 and C14 is the power supply of the carrier wave oscillating circuit for the carrier wave frequency stabilization.

Figure 5:
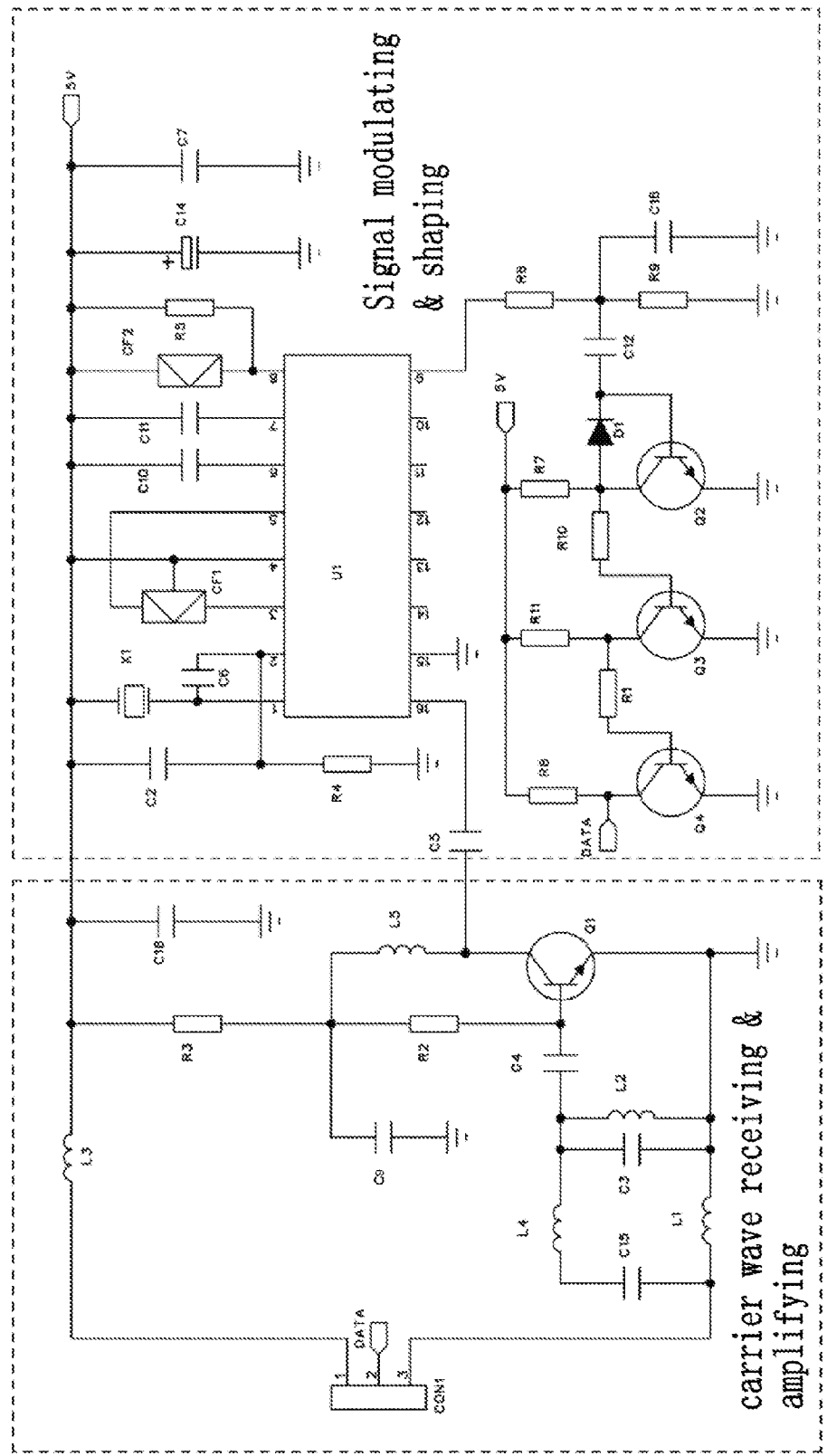
FIG. 5 is the circuit schematic diagram of the carrier wave receiving module of the present invention.
Figure 6:
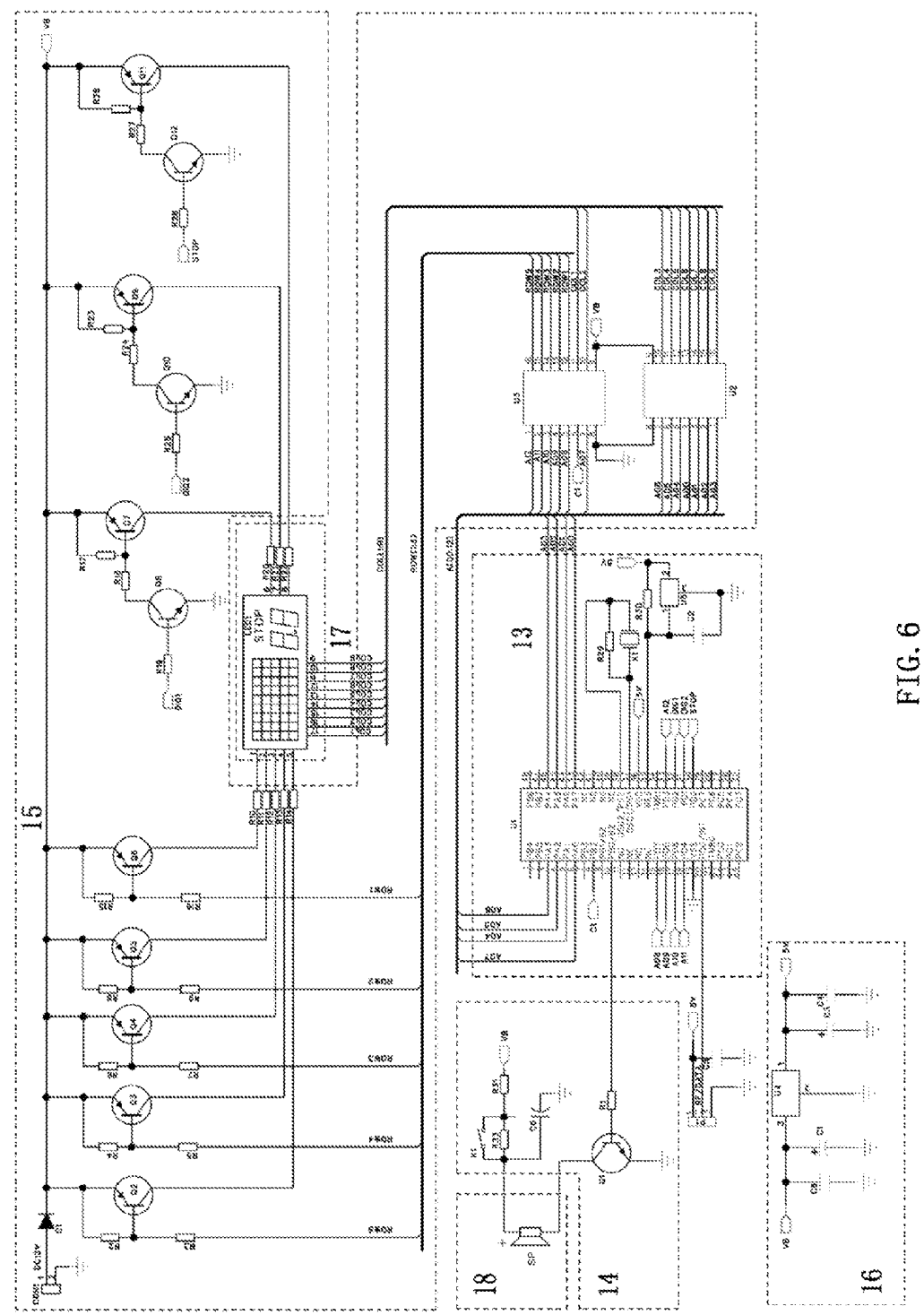
FIG. 6 is the circuit schematic diagram of the digital display of the present invention.

As the FIG. 5 shown, the carrier wave signals are input to CON1 in FIG. 6 via the power wire of the reversing gear light in the instrument panel of the automobile, and pass to CON2 of the carrier wave module in FIG. 5 via P1 socket in FIG. 6, isolated by L1 and L3, and then the carrier wave signals are made by C15, L4, L2 and C3, and are amplified by the receiving amplifying circuit composed Q1, R2, C9, L5 and R3, then input to U1 16th pin for the following frequency mixing with local oscillating circuit of U1, X1, C2, R4 and C6, Then, U1 3rd pin output the mid-frequency signals, these signals are filtered by CF1 and sent to the frequency discrimination circuit of U1, CF2 and R5 for their modulation. U1 9th pin will -6-output display signals, these display signals are amplified by the amplifying circuit of Q2 and its peripheries, and are shaped by the shaping circuit of Q3, Q4 and their peripheries, finally that signals output to P1 in FIG. 6 from CON2.

As the FIG. 6 shown, CON 1, the power socket, is connected to the power wire of the reversing gear light in instrument panel of the automobile, D1 is a polarity protecting diode, and D1, U4, C1, C8, C3 and C4 form the power circuit which supply electricity to all carrier wave receiving module and digital display respectively. The display signals modulated by carrier wave receiving module in FIG. 5, are input to P1 in FIG. 6 via CON2, and then input to 20th pin of the micro-processor U1, the display drive signals will be output from 3rd -6th, 15th- 18th , 30th -33rd and 43rd -46th pin after U1 processing, and input to the display drive circuit of U2, U3, Q2-Q11 and their peripheries, the driving matrix LED1 will indicate the distance between the barriers and the automobile with audio signals from U1 10th pin. The audio signals are then amplified by the sound amplifying circuit of R1, Q1, C6, R32, K1 and R31, and drive the horn loud, so that it warn the driver about the distance between the barriers and the automobile.

Using the present invention, the digital display in it will indicate the status of the barrier detected by the host machine normally when the distance of the host machine and the digital display is within 20 m. And if two automobiles are equipped with two power wire carrier wave automobile anti-collision radars respectively, the one will not have interference with the other with the closest distance when reversing ( with one automobile's rear view mirror close to the other's body).

The above description is about a special example of the invention, which is not limited within the specific structure described or illustrated in above-mentioned instructions, the claims cover all essences and alternative embodiments of the invention. -7-

The invention claimed is:

1. A power wire carrier wave automobile anti-collision radar comprises ultrasonic wave transmitting and receiving sensors, a host machine, and a digital display;

the host machine further comprises an ultrasonic wave transmitting and receiving amplifying circuit, a band-pass amplifying circuit, a double voltage shaping circuit, an electronic switch, a first micro-processor and a first power circuit;

the host machine being mounted inside the trunk of the automobile;

the digital display comprising a second micro-processor, a sound amplifying circuit, a horn, a display drive circuit, an LED and a second power circuit;

the digital display being laid on the instrument panel of the automobile;

wherein a positive pole of the power wire of said host machine is connected to a positive pole of the reversing light wire at the rear of the automobile, and its negative pole is earthed;

and wherein the positive pole of the power wire of said digital display is connected to the positive pole of the reversing gear light wire in the instrument panel of the automobile and its negative pole is earthed.

2. The power wire carrier wave automobile anti-collision radar according to claim 1, wherein there is a carrier wave transmitting circuit in said host machine, a signal output of the first micro-processor in said host machine is connected to a signal input of said transmitting circuit, the signal output of said transmitting circuit is connected to one end of the power wire of said host machine.

3. The power wire carrier wave automobile anti-collision radar according to claim 1, wherein there is a carrier wave receiving circuit in said digital display, a signal input of said receiving circuit is connected to one end of the power wire of said digital display, a signal output of said receiving circuit is connected to a signal input of the second micro-processor in said digital display.

* * * * *